(12) United States Patent
Klein

(10) Patent No.: US 9,488,515 B2
(45) Date of Patent: Nov. 8, 2016

(54) APPARATUSES AND METHODS FOR FUEL LEVEL SENSING

(71) Applicant: Deringer-Ney, Inc., Bloomfield, CT (US)

(72) Inventor: Arthur S. Klein, Orange, CT (US)

(73) Assignee: DERINGER-NEY, INC., Bloomfield, CT (US)

( * ) Notice: Subject to any disclaimer, the term of this patent is extended or adjusted under 35 U.S.C. 154(b) by 307 days.

(21) Appl. No.: 14/222,975

(22) Filed: Mar. 24, 2014

(65) Prior Publication Data

US 2015/0268085 A1  Sep. 24, 2015

(51) Int. Cl.
*G01F 23/36* (2006.01)

(52) U.S. Cl.
CPC .............. *G01F 23/363* (2013.01); *G01F 23/36* (2013.01)

(58) Field of Classification Search
CPC .................................................... G01F 23/363
See application file for complete search history.

(56) References Cited

U.S. PATENT DOCUMENTS

| | | |
|---|---|---|
| 254,764 A | 3/1882 | Fox |
| 260,623 A | 7/1882 | Starr |
| 266,911 A | 10/1882 | Starr |
| 515,970 A | 3/1894 | Ries |
| 736,297 A | 8/1903 | Reed |
| 1,036,304 A | 8/1912 | Misland |
| 1,232,450 A | 7/1917 | Misland |
| 1,602,671 A | 10/1926 | Henderson |
| 1,610,591 A | 12/1926 | Redman |
| 2,564,416 A | 8/1951 | Wildhack |
| 2,627,178 A | 2/1953 | Hayward et al. |
| 2,710,898 A | 6/1955 | Greene |
| 2,713,150 A | 7/1955 | Bearinger |
| 3,134,045 A | 5/1964 | Shulman et al. |
| 3,629,774 A | 12/1971 | Crites |
| 3,774,449 A | 11/1973 | Carol, Jr. |

(Continued)

FOREIGN PATENT DOCUMENTS

| | | |
|---|---|---|
| EP | 1291623 A1 | 3/2003 |
| EP | 1407236 B1 | 5/2005 |

(Continued)

OTHER PUBLICATIONS

PCT International Search Report for PCT/US2015/019600, mailed Jun. 2, 2015, pp. 1-4.

(Continued)

*Primary Examiner* — Paul West
(74) *Attorney, Agent, or Firm* — Dorsey & Whitney LLP; Bridget M. Hayden, Esq.

(57) ABSTRACT

Apparatuses and methods for fuel level sensing are described herein. An example sensor may include a sealed housing and an electrically conductive coil. The sealed housing may comprise a pivot end, a float end opposite the pivot end, and an interior defined by walls extending therebetween. The pivot end may be adapted to join a pivot point and the float end may be adapted to join to a float at an exterior of the housing. The electrically conductive coil spring is disposed in the housing interior and comprises a first end and a second end opposite the first end. The coil spring is adapted to expand and retract in response to movement of the internal float within the housing and to electrically couple to a circuit configured to sense a change in resistance in the coil spring in response to expansion and retraction of windings of the coil spring.

16 Claims, 6 Drawing Sheets

(56) References Cited

U.S. PATENT DOCUMENTS

| | | |
|---|---|---|
| 3,834,576 A | 9/1974 | Heisterberg |
| 3,925,747 A | 12/1975 | Woodward et al. |
| 4,107,998 A | 8/1978 | Taylor |
| 4,532,491 A | 7/1985 | Rau et al. |
| 4,589,282 A | 5/1986 | Dumery |
| 4,723,446 A | 2/1988 | Saito |
| 4,831,878 A | 5/1989 | Hayashi et al. |
| 4,928,526 A | 5/1990 | Weaver |
| 5,059,939 A | 10/1991 | Wu |
| 5,247,834 A | 9/1993 | Woss |
| 5,666,851 A | 9/1997 | Bacon |
| 6,401,533 B1 | 6/2002 | Gier et al. |
| 6,681,628 B2 | 1/2004 | Sawert et al. |
| 7,315,165 B2 | 1/2008 | Kleinen et al. |
| 7,621,182 B2 | 11/2009 | Chen |
| 2003/0066229 A1 | 4/2003 | Chu |
| 2006/0016256 A1 | 1/2006 | Bauerle et al. |
| 2009/0038395 A1 | 2/2009 | Roth et al. |
| 2011/0005312 A1 | 1/2011 | Hopper |
| 2012/0174398 A1 | 7/2012 | Rust |
| 2012/0186341 A1 | 7/2012 | Oike et al. |
| 2013/0055807 A1 | 3/2013 | Cochran et al. |
| 2013/0146604 A1 | 6/2013 | Moreno et al. |
| 2014/0096603 A1* | 4/2014 | Nichols .................. G01F 23/30 73/305 |

FOREIGN PATENT DOCUMENTS

| | | |
|---|---|---|
| EP | 1983313 A2 | 10/2008 |
| EP | 2216633 A1 | 8/2010 |
| EP | 1312898 A2 | 7/2011 |
| EP | 1821081 B1 | 10/2012 |
| FR | 2526765 | 11/1983 |
| FR | 2633392 A1 | 12/1989 |
| FR | 2975487 A1 | 11/2012 |
| GB | 905226 | 9/1962 |
| GB | 1558250 A | 12/1979 |
| GB | 2187847 A | 9/1987 |
| JP | S60185123 A | 9/1985 |
| JP | 62-140030 A | 6/1987 |
| KR | 20110101932 A | 9/2011 |
| SU | 881523 B * | 11/1981 |
| WO | 01/45213 A1 | 6/2001 |
| WO | 2005/057138 A2 | 6/2005 |
| WO | 2006132494 A1 | 12/2006 |

OTHER PUBLICATIONS

PCT International Search Report for PCT/US2015019607, mailed Jun. 9, 2015, pp. 1-5.

PCT Written Opinion for PCT/US2015/019600, mailed Jun. 2, 2015, pp. 1-7.

PCT Written Opinion for PCT/US2015/019607, mailed Jun. 9, 2015, pp. 1-7.

Smith III, E. et al., "Design Guidelines for Automotive Fuel Level Sensors", "Design Guidelines for Automotive Fuel Level Sensors" Paper No. 2002-01-1074; Society of Automotive Engineers, Inc. 2002. (9 pages).

PCT Search Report for PCT/US2015/019605, mailed Jun. 29, 2015, pp. 1-5.

PCT Written Opinion for PCT/US2015/019605, mailed Jun. 29, 2015, pp. 1-8.

* cited by examiner

APPARATUSES AND METHODS FOR FUEL LEVEL SENSING

TECHNICAL FIELD

Examples of the present invention relate generally to fuel level sensors, and more particularly to fuel level sensors implementing internal floats.

BACKGROUND

Fuel level sensors, such as those utilizing a float, are commonly used to determine fuel levels of a fuel tank. Such fuel level sensors often comprise sealed fuel level sensors, where particular components of a fuel level sensor are enclosed in a housing to prevent the components from being directly exposed to fuel of the fuel tank.

In many instances, however, implementations of fuel level sensors present reliability issues. For example, despite efforts, many sealed fuel level sensors suffer from leakage as a result of poor sealing, punctured housing, corrosion, or combinations thereof. As another example, many sealed fuel level sensors include mechanical components susceptible to wear, fatigue, and loosening. In either case, operation may be significantly compromised by these respective causes of failure.

SUMMARY OF THE INVENTION

According to one implementation, a sensor includes a sealed housing with a pivot end, a float end opposite the pivot end and an interior defined by walls extending therebetween. The pivot end is adapted to join to a pivot point, while the float end is adapted to join to a float at an exterior of the housing. An electrically conductive coil spring is disposed in the housing interior, where a first end is joined to the housing at one of the pivot end or the float end and a second end of the coil spring opposite the first end is joined to an internal float within the housing. The coil spring is adapted to expand and retract in response to movement of the internal float within the housing and further is adapted to electrically couple to a circuit configured to sense a change in resistance in the coil spring by expansion and retraction of windings of the coil spring.

According to another implementation, a fuel sensor includes a fuel sensor housing adapted to be arranged in the fuel tank. The housing includes a pivot end, a float end opposite the pivot end and an interior defined by walls extending therebetween. The pivot end is adapted to join to a pivot point in the fuel tank, and the float end is adapted to join to an external float arranged in the fuel tank and at an exterior of the housing. An electrically conductive coil spring is disposed in the housing interior and is joined to an internal float within the housing. A resistance sensor is electrically coupled to the coil spring, and as pivot angle of the fuel sensor changes in response to fuel level changes, the resistance sensor senses a change in resistance in the coil spring as the coil spring expands or retracts.

In yet another implementation, a method of sensing fuel levels in a fuel tank involves sensing a resistance of a conductive path using a resistance sensor. The resistance sensor may include a housing with a pivot end, a float end opposite the pivot end and an interior defined by walls extending therebetween. The pivot end may be adapted to join to a pivot point in the fuel tank. The float end of the housing may be adapted to join to an external float arranged in the fuel tank at an exterior of the housing. The sensor additionally includes an electrically conductive coil spring disposed in the interior of the housing. The coil spring joins to an internal float within the housing, and the internal float is configured to adjust a resistance of the electrically conductive coil spring. The resistance is indicative of a fuel level of the fuel tank. The method continues by translating the resistance into the fuel level.

DETAILED DESCRIPTION

Apparatuses and methods for fuel level sensing are disclosed herein. Certain details are set forth below to provide a sufficient understanding of embodiments of the invention. However, it will be clear to one having skill in the art that implementations may be practiced with or without these particular details. Moreover, the particular embodiments of the present invention described herein are provided by way of example and should not be construed as limiting. In other instances, well-known components, circuits, and operations have not been shown in detail as being know to those of skill in the art.

The present disclosure is directed generally to fuel level sensors. A fuel level sensor may be a sensor located in a fuel tank and configured to provide one or more signals indicating fuel levels of the fuel tank. A fuel sensor may, for instance, include a conductive path having a resistance proportionate to the fuel level. That is, the greater the fuel level, the greater the resistance of the conductive path, and the lesser the fuel level, the lesser the resistance of the conductive path, or vice versa. The conductive path may be coupled to external control logic, which may be adapted to determine the resistance of the conductive path and translate the resistance into a fuel level.

Figure 1:
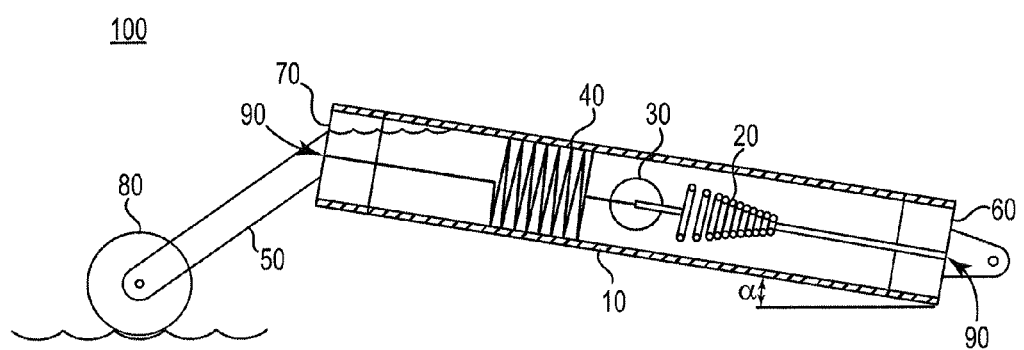
FIG. 1 is a diagram of a cross-sectional view of a fuel level sensor in a first position according to an embodiment of the present invention.

FIG. 1 is a diagram of a cross-sectional view of a fuel level sensor 100 in a first position according to one implementation. The fuel level sensor 100 includes a sealed housing 10, a coil spring 20, an internal float 30, a balance spring 40, a float arm 50, a pivot cap 60, a connection cap 70, an external float 80 and a conductive path 90.

Each end of the sealed housing 10 may be sealed by a respective cap 60, 70 such that the sealed housing 10 is liquid tight. For instance, a first end of the sealed housing 10 may be sealed using a pivot cap 60 to form a "pivot end" and a second end of the sealed housing 10 may be sealed using a connection cap 70 to form a "float end." Each of the pivot cap 60 and the connection cap 70 may be sealed at a respective end of the sealed housing 10 using an adhesive, such as glue. The pivot cap 60 may be coupled (e.g., rotatably joined) to a point of an interior of a fuel tank (not shown in FIG. 1) to form a "pivot point." The connection cap 70 may be coupled (e.g., fixedly joined) to a float arm 50. The external float 80 may provide additional buoyancy to the float arm 30 and may be indirectly joined to the connection 70 cap via a cable or other suitable mechanical linkage.

Briefly, the float arm 50 may be configured to change in position responsive to changes in fuel level of the fuel tank. By way of example, the float arm 50 may be configured to be buoyant when submersed in fuel such that the float arm 50 rises and falls with the fuel level of the fuel tank. Because the float arm 50 may be coupled to the connection cap 70, as the float arm 50 rises and falls with respective fuel levels, the sealed housing 10 may be displaced by the float arm 50. For example, the sealed housing 10 may be rotated about the pivot point as the float arm 50 rises and falls; the sealed housing 10 may rotate to a more vertical orientation responsive to the float arm 50 rising and rotate to a more horizontal orientation responsive to the float arm 50 falling. Alternatively, the sealed housing 10 may comprise materials having a lesser density compared to the external fluid, and may include closed cell foam, or may be wrapped in materials having a lesser density than the external fluid, such as a buoyant sleeve. In these instances, the float arm 50 may be omitted from the fuel level sensor 100.

The sealed housing 10 may be substantially cylindrical in shape, or may have any other shape. In some embodiments, for instance, the sealed housing 10 may be hyper-rectangular or conical in shape and further may be curved in a vertical and/or horizontal direction. The sealed housing 10 may comprise any material known in the art, now or in the future, such as glass, plastic, metal, rubber, or any combination thereof, and accordingly may be configured to resist and/or mitigate corrosion from one or more liquid fuels.

In at least one example, the sealed housing 10 may be liquid tight and filled with a non-conductive fluid. In this manner, one or more components of the fuel level sensor 100 located in the housing 10 may be submersed and/or suspended in the non-conductive fluid. The non-conductive fluid may be an inert fluid, a dielectric fluid, or any combination thereof. In some implementations, the non-conductive fluid may serve to dampen or absorb forces within the sealed housing 10. In addition, the non-conductive fluid may extend the lifetime of the internal components of the sealed housing 10 by carrying debris away from the components so that movement of the components is not impeded by such debris, thereby preventing wear and deterioration. In some instances, the sealed housing 10 may only be partially filled with the non-conductive fluid, and any portion of the sealed housing 10 not filled with the non-conductive fluid may be filled with an inert gas, such as argon or nitrogen.

Each of the coil spring 20, the internal float 30, and balance spring 40 may be located within an interior of the sealed housing 10 and may be coupled in series between the pivot cap 60 and connection cap 70. For example, as illustrated in FIG. 1, the coil spring 20 may be coupled to the pivot cap 60 and the internal float 30, the internal float 30 may further be coupled to the balance spring 40, and the balance spring may further be coupled to the connection cap 70.

The coil spring 20 may be an electrically conductive spring and may be configured to expand and retract during operation of the fuel sensor 100. In some examples, the coil spring 20 may comprise a spring resistor (e.g., variable spring resistor) and have a resistance that varies according to the expansion and retraction of the coil spring 20. For example, as the coil spring 20 is expanded, an increasing number of the coils (e.g., windings) of the coil spring 20 may be separated, resulting in a longer conductive path 90 from end to end of the coil spring 20, and thus an increased resistance. As the coil spring is retracted, an increasing number of the coils of the coil spring 20 may be electrically coupled, resulting in a shorter conductive path 90 from end to end of the coil spring 20, and thus a decreased resistance. In at least one embodiment, the resistance of the coil spring 20 may change linearly (e.g., proportionately) with respect to expansion and retraction. In other embodiments, the resistance of the coil spring 20 may change exponentially, or in another other manner.

The coil spring 20 may be substantially conical in shape such that respective circumferences of windings change over a length of the coil spring 20. In at least one embodiment, the conical shape of the coil spring 20 may taper toward the pivot cap 60. Accordingly, as the coil spring 20 expands and retracts during operation, coils of the coil spring 20 may be separated substantially uniformly. In another embodiment, the conical shape of the coil spring 20 may taper toward the connection cap 70. While the coil spring is described as having a conical shape, a spring having any shape and/or any tension may be used to implement the coil spring 20. In some examples, the coil spring may comprise stainless steel, nickel chrome alloys, or a combination thereof.

The internal float 30 may be configured to be buoyant relative to the non-conductive fluid of the sealed housing 10, and further may be submersed in the non-conductive fluid, as described. Accordingly, the non-conductive fluid may cause a buoyant force to be applied to the internal float 30. The magnitude of the buoyant force may be determined in accordance with the following equation:

$$BF \sim \frac{\sin\alpha}{D \times V}$$

where BF represents the buoyant force; a represents the angle of the sealed housing 10 relative to a horizontal plane of the pivot point, or pivot angle; D represents the density of the fluid in which the internal float 30 is submersed; and V represents the volume of the fluid displaced by the internal float 30.

In response to the buoyant force, the internal float 30 may apply a corresponding tension to the coil spring 20 to expand the coil spring 20. As described, the sealed housing 10 may be rotated about a fixed point as defined by the fixed cap 60. As the sealed housing 10 is rotated, the magnitude of the tension applied by the internal float 30 on the coil spring 20 may be adjusted. By way of example, the more vertical the orientation of the sealed housing 10 relative to the fuel tank (recall that the higher the fuel level of the fuel tank, the more vertical the sealed housing 10), the greater the tension applied by the internal float 30 on the coil spring 20, and conversely, the more horizontal the orientation of the sealed housing 10 relative to the fuel tank, the lesser the tension applied by the internal float 30 on the coil spring 20. In this manner, the coil spring 20 may be expanded and retracted by the internal float 30 and as a result the resistance of the coil spring 20 may be decreased and increased, respectively.

The balance spring 40 may be configured to expand and retract during operation of the fuel sensor 100 and may, for instance, have a relatively high modulus. The balance spring may expand and retract in a complementary manner of that of the coil spring 20. In this manner, the balance spring 40 may compensate for displacement of the internal float 30 relative to the housing 10 during operation. In some implementations, the balance spring 40 may be an electrically conductive spring, described further below.

In some examples, the internal float 30 may be configured to electrically couple the coil spring 20 and the balance spring 40. For example, the internal float 30 may include a conductive element that is configured to electrically couple the coil spring 20 and the balance spring 40. Alternatively, the coil spring 20 and the balance spring 40 may be electrically coupled. Furthermore, each of the pivot cap 60 and the connection cap 70 may be conductive and configured to act as an electrical terminal of the fuel level sensor 100. In some examples, the pivot cap 60 may include a wire coupled to the coil spring 20 and extending out of the sealed housing 10 through the pivot cap 60. Similarly, the connection cap 70 may include a wire coupled to the balance spring 40 and extending out of the sealed housing 10 through the connection cap 70. Thus, a conductive path 90 may be formed between each of the caps 60, 70 via the coil spring 20, the internal float 30, and the balance spring 40; or alternatively, the conductive path 90 may be formed between the caps 60, 70 via the coil spring 20 and the balance spring 40. Because each of the caps 60, 70 may include a wire extending out of the sealed housing 10, the conductive path 90 may be accessible to one or more external circuits (not shown in FIG. 1). Moreover, because the internal float 30 may apply a tension to the coil spring 20 during operation, the resistance of the conductive path 90 may be adjusted as the coil spring 20 expands and retracts. Briefly, a range of fuel levels in the fuel tank may therefore correspond to a range of resistances of the conductive path 90, and more specifically, to a range of resistances of the coil spring 20.

The fuel level sensor 100 may include a conductive path 90 for electrically coupling the fuel level sensor 100 to external control logic of the fuel sensor. The conductive path 90 may be defined by electrically conductive components extending from an interior of the sealed housing 10 to an exterior of the housing. While the conductive path 90 of fuel level sensor 100 has been described as including caps 60, 70, coil spring 20 and balance spring 40, alone or in combination with the internal float 30, it will be appreciated that in some embodiments one or more components of the conductive path 90 may be omitted and/or one or more components may be added to the conductive path 90. For example, in one embodiment, the balance spring 40 may be omitted such that the internal float 30 is coupled to the connection cap 70 directly and/or using a wire. In another embodiment, the conductive path 90 may include one or more resistors to increase the overall resistance. In another example, the conductive path 90 of the fuel level sensor 100 may be provided at either one of the caps 60, 70, in which the coil spring 20 and optionally the balance spring 40 and/or internal float 30 may be electrically coupled to one of the caps 60, 70 via two conductive leads extending therefrom. For example, a first conductive lead may extend from one end of the coil spring and a second conductive lead may extend from another, opposite end of the coil spring and the leads may electrically couple to one of the caps 60, 70. In operation, the fuel level sensor 100 may generally be used to determine a fuel level in a fuel tank. In an example operation of the fuel level sensor 100, a fuel level of a fuel tank may be at a particular level, and as described, the float arm 50 and external float 80 may be displaced at particular height in the fuel tank based on these components floating on the fuel surface. Because the float arm 50 is coupled to the sealed housing 10, the sealed housing 10 may be at a pivot angle associated with the fuel level. A buoyant force may be applied to the internal float 30 based on the pivot angle. In turn the internal float 30 may provide a tension to the coil spring 20 to extend the coil spring 20 a particular amount and thereby determine the resistance of the coil spring 20. An external circuit coupled to one or both of the caps 60, 70 of the fuel level sensor 100 may determine the resistance of the conductive path 90 and based on the resistance of the conductive path 90, determine the fuel level. In some examples, the external circuit may determine the resistance of the coil spring 20 from the resistance of the conductive path 90 and determine the fuel level from the resistance of the coil spring 20.

As the fuel level of the fuel tank changes, the height of the float arm 50 and external float 80 resting on the fuel surface may change as well, and during this change, the float arm 50 may rotate the sealed housing 10 about the fixed point. This rotation may change the orientation of the sealed housing 10 such that the sealed housing is more vertically orientated or more horizontally orientated, thereby changing the buoyant force applied to the internal float 30. The change in buoyant force may adjust the tension applied to the coil spring 20 and in turn adjust the resistance of the coil spring 20 by expanding or retracting the coil spring 20. As one or both of the caps 60, 70 may be coupled to an external circuit, described above, the resistance of the conductive path 90 may be used to determine the new fuel level of the fuel tank.

With reference to FIG. 1, the fuel level sensor 100 is shown in a position in an instance in which a fuel tank has a low fuel level (e.g., the fuel tank is empty or near empty). Due to the low fuel level, the pivot angle of the sealed housing 10 is relatively small (e.g., 0 degrees), resulting in a low buoyant force being applied to the internal float 30 and consequently, a low tension being applied to the coil spring 20. The coil spring 20 may be in a retracted state where most or all of the coils of the coil spring 20 are electrically coupled to one another, causing the coil spring 20 to have a relatively low resistance.

Figure 2:
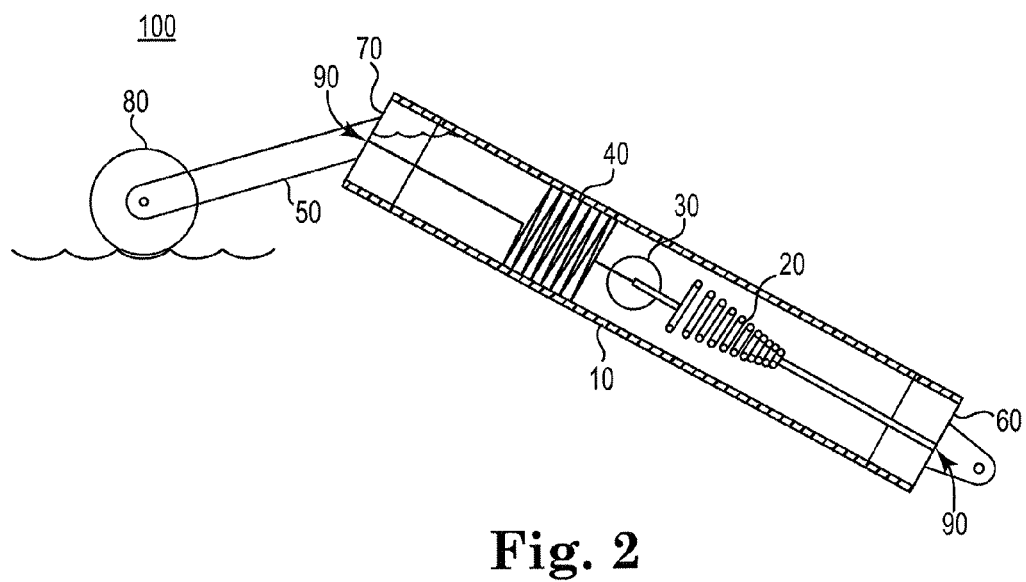
FIG. 2 is a diagram of a cross-sectional view of a fuel level sensor in a second position according to an embodiment of the present invention.

With reference to FIG. 2, the fuel level sensor 100 is shown in a position in an instance in which a fuel tank has a moderate fuel level (e.g., the fuel tank is approximately half full). Due to the moderate fuel level, the pivot angle of the sealed housing 10 is moderate (e.g., 45 degrees), resulting in a moderate buoyant force being applied to the internal float 30 and consequently, a moderate tension being applied to the coil spring 20. The coil spring 20 may be in a moderately expanded state where a portion of the coils of the coil spring 20 are separated, causing the coil spring 20 to have a moderate resistance.

Figure 3:
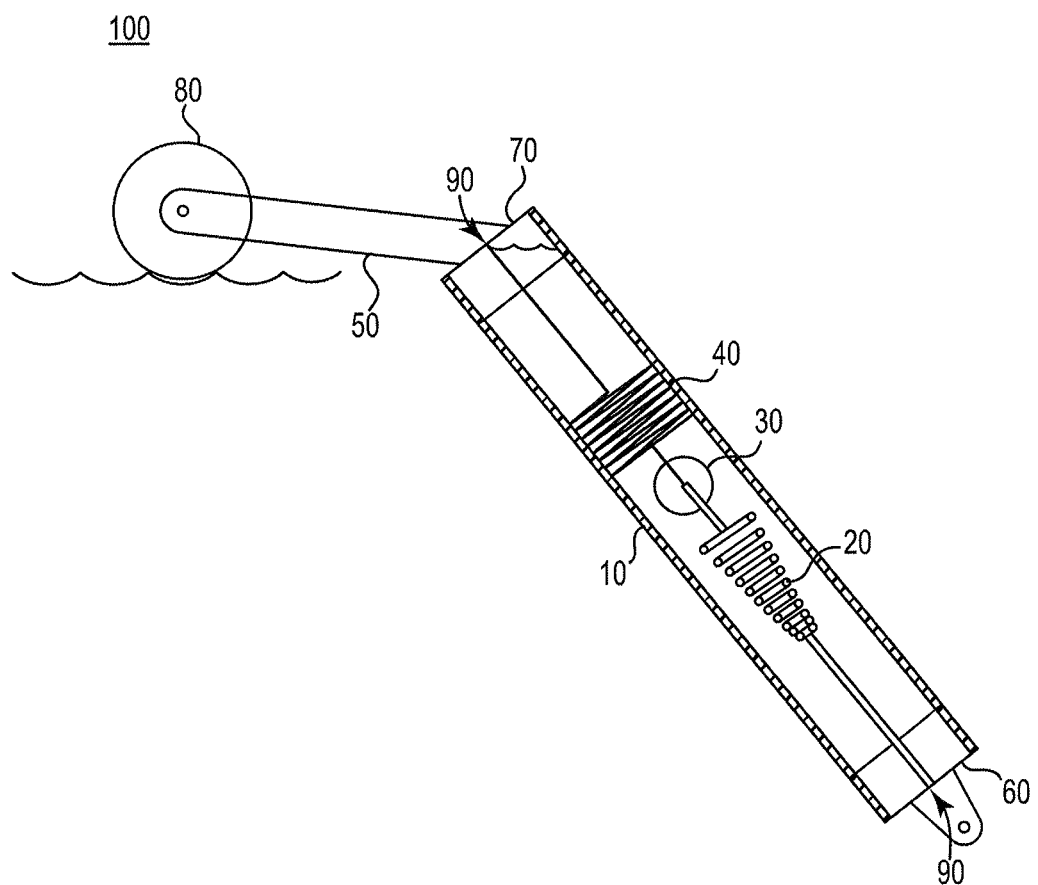
FIG. 3 is a diagram of a cross-sectional view of a fuel level sensor in a third position according to an embodiment of the present invention.

With reference to FIG. 3, the fuel level sensor 100 is shown in a position in an instance in which a fuel tank has a high fuel level (e.g., the fuel tank is near full or full). Due to the high fuel level, the pivot angle of the sealed housing 10 is relatively large (e.g., 90 degrees), resulting in a high buoyant force being applied to the internal float 30 and consequently, a high tension being applied to the coil spring 20. The coil spring 20 may be in an expanded state where most or all of the coils of the coil spring 20 are separated, causing the coil spring 20 to have a relatively high resistance.

While the range of pivot angles discussed with respect to FIGS. 1-3 spans from approximately 0 to 90 degrees, in some examples, the fuel level sensor 100 may operate over any range of pivot angles. For example, the fuel level sensor 100 may operate over a range spanning from 30 to 60 degrees such that a 30 degree angle corresponds to a low fuel level, a 45 degree angle corresponds to a moderate fuel level, and a 60 degree angle corresponds to a high fuel level.

According to alternative implementations, the coil spring 20 and balance spring 40 may be reversed compared to their arrangement shown in FIGS. 1-3, and the coil spring 20 may join to the connection cap 70 and the balance spring 40 may join to the connection cap 60 proximate the pivot point of the device. Consequently, although buoyant movement of the internal float 30 results in movement of the coil spring 20 and the balance spring 40, as internal float 30 moves towards the connection cap 70 (e.g., upon a pivoting movement of the fuel level sensor 100 towards vertical), a retraction force may be applied to the coil spring 20 as the windings of the coil spring 20 retract or relax towards the connection cap 70 resulting in a relatively low resistance. In this alternative arrangement, as the internal float 30 moves towards the connection cap, an expansion force may be applied to the balance spring 40 causing the windings of the balance spring 40 to expand. Although not described in detail, this alternative arrangement of the fuel level sensor components within the sealed housing 10 may enable sensing of fuel levels within a fuel tank using a reverse approach compared to the approach described in connection with FIGS. 1-3, and in this alternative arrangement, high fuel levels may correspond to relatively low resistance readings, moderate fuel levels may correspond to relatively moderate resistance readings, and low fuel levels may correspond to relatively high resistance readings.

Figure 4:
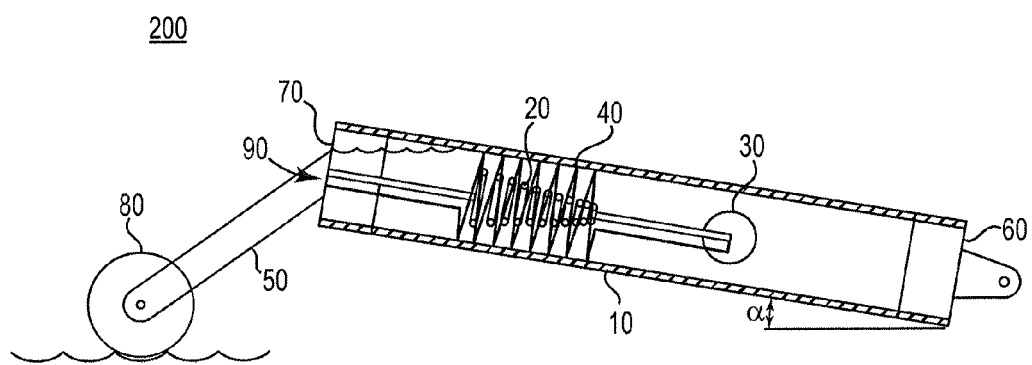
FIG. 4 is a diagram of a cross-section view of a fuel level sensor in a first position according to another embodiment of the present invention.

Examples directed to the conductive path 90 have been described herein as including the coil spring 20, internal float 30, and balance spring 40 coupled in series. In some examples, a coil spring may be arranged coaxially relative to the balance spring 40. Accordingly, FIG. 4 is a diagram of a cross-sectional view of a fuel level sensor 200 in a first position according to another implementation of the present disclosure. The fuel level sensor 200 includes elements that have been previously described with respect to the fuel level sensor 100 of FIGS. 1-3. Those elements have been shown in FIGS. 4-6 using the same reference numbers used in FIGS. 1-3 and operation of the common elements is as previously described unless otherwise specified.

As illustrated in FIG. 4, the coil spring 20 and balance spring 40 may be coupled (e.g., in series) at a "coupling point" and one or more of the coil spring 20 and the balance spring 40 may be coupled to the internal float 30 at or near the coupling point. The remaining ends of each of the coil spring 20 and the balance spring 40 may be coupled to the connection cap 70. In some examples, the coil spring 20 may be coaxially located within the balance spring 40. In other examples, the coil spring 20 may be coaxially located outside of the balance spring 40.

As described in further detail below, the coil spring 20 and the balance spring 40 may form a conductive path 90. Accordingly, in some examples, the coil spring 20 and the balance spring 40 may be configured to be electrically isolated from one another except at the coupling point. For example, the coil spring 20 and the balance spring 40 may be spaced apart coaxially such that, save for the coupling point, neither spring 20, 40 physically contacts the other despite any expansion or retraction of either the coil spring 20 and the balance spring 40 during operation. In another embodiment, a layer comprising dielectric material may be located between the coil spring 20 and the balance spring 40.

Because the internal float 30 may be coupled to the coil spring 20 and/or the balance spring 40 at the coupling point, in response to a buoyant force, the internal float 30 moves towards the connection cap 70, and the internal float 30 may apply a corresponding compression force to the coil spring 20 and the balance spring 40 to retract the coil spring 20 and/or the balance spring 40 towards the connection cap 70. In some examples, increasing the force applied to the balance spring 40 may further relax the balance spring. As described, the sealed housing 10 may be rotated about a fixed point as defined by the pivot cap 60. As the sealed housing 10 is rotated, the magnitude of the compression force applied by the internal float 30 may be adjusted. By way of example, the more vertical the orientation of the sealed housing 10 relative to the fuel tank, the greater the force applied by the internal float 30, and conversely, the more horizontal the orientation of the sealed housing 10 relative to the fuel tank, the lesser the force applied by the internal float 30. In this manner, both the coil spring 20 and the balance spring 40 may be expanded and retracted by the internal float 30. As a result, the resistance of the coil spring 20 may be decreased and increased, respectively.

The connection cap 70 may be conductive and/or may include electric terminals coupled to each of the coil spring 20 and the balance spring 40, respectively. For example, the connection cap 70 may include wires coupled to the coil spring 20 and balance spring 40, respectively, and extending out of the sealed housing 10 through the connection cap 70. Thus, a conductive path 90 may be formed between terminals of the connection cap 70, via a first terminal, the coil spring 20, the balance spring 40, and a second terminal. Because the connection cap 70 may include wires extending out of the sealed housing 10, the conductive path 90 may be accessible to one or more external circuits (not shown in FIG. 4). Moreover, because the internal float 30 may apply a force during operation, the resistance of the conductive path 90 may be adjusted as the coil spring 20 expands and retracts. Briefly, a range of fuel levels in the fuel tank may therefore correspond to a range of resistances of the conductive path 90, and more specifically, to a range of resistances of the coil spring 20

While the conductive path 90 of fuel level sensor 200 has been described as including connection cap 70, coil spring 20, and balance spring 40, it will be appreciated that in some embodiments one or more components of the conductive path 90 may be omitted and/or one or more components may be added to the conductive path 90. For example, in one embodiment, the balance spring 40 may be omitted such that the conductive path includes the connection cap 70, the coil spring 20, and a wire coupled between the coil spring 20 and the connection cap 70. In another embodiment, the conductive path 90 may include one or more resistors to increase the overall resistance.

In operation, the fuel level sensor 200 may generally be used to determine a fuel level in a fuel tank. In an example operation of the fuel level sensor 200, a fuel level of a fuel tank may be at a particular level, and as described, the float arm 50 and the external float 80 may be displaced at particular height as the float 80 rests on a surface of the fuel. Because the float arm 50 is coupled to the sealed housing 10, the sealed housing 10 may be at a pivot angle associated with the fuel level. A buoyant force may be applied to the internal float 30 based on the pivot angle. In turn the float 30 may move towards the connection cap 70 and provide a force on the coil spring 20 and the balance spring 40 to compress the coil spring 20 a particular amount, and thereby determine the resistance of the coil spring 20. An external circuit coupled to terminals of the connection cap 70 of the fuel level sensor 200 may determine the resistance of the conductive path between the terminals of the connection cap 70 and based on the resistance of the conductive path may determine the fuel level. In some examples, the external circuit may determine the resistance of the coil spring 20 from the resistance of the conductive path and determine the fuel level from the resistance of the coil spring 20.

As the fuel level of the fuel tank changes, the height of the float arm 50 may change as well, and the float arm 50 may rotate the sealed housing 10 about the fixed point. This rotation may change the orientation of the sealed housing 10 such that the sealed housing is more vertically orientated or more horizontally orientated, thereby changing the buoyant force applied to the internal float 30. The change in buoyant force may adjust the force applied to the coil spring 20 and in turn adjust the resistance of the coil spring 20 by expanding or retracting the coil spring 20. As terminals of the connection cap 70 may be coupled to an external circuit, described above, the resistance of the conductive path may be used to determine the new fuel level of the fuel tank.

With reference to FIG. 4, the fuel level sensor 200 is shown in a position in an instance in which a fuel tank has a low fuel level (e.g., the fuel tank is empty or near empty). Due to the low fuel level, the pivot angle of the sealed housing 10 is relatively small (e.g., 0 degrees), resulting in a low buoyant force being applied to the internal float 30 and consequently, a low force being applied to the coil spring 20. The coil spring 20 may be in an expanded state where most or all of the coils of the coil spring 20 are separated, causing the coil spring 20 to have a relatively high resistance.

Figure 5:
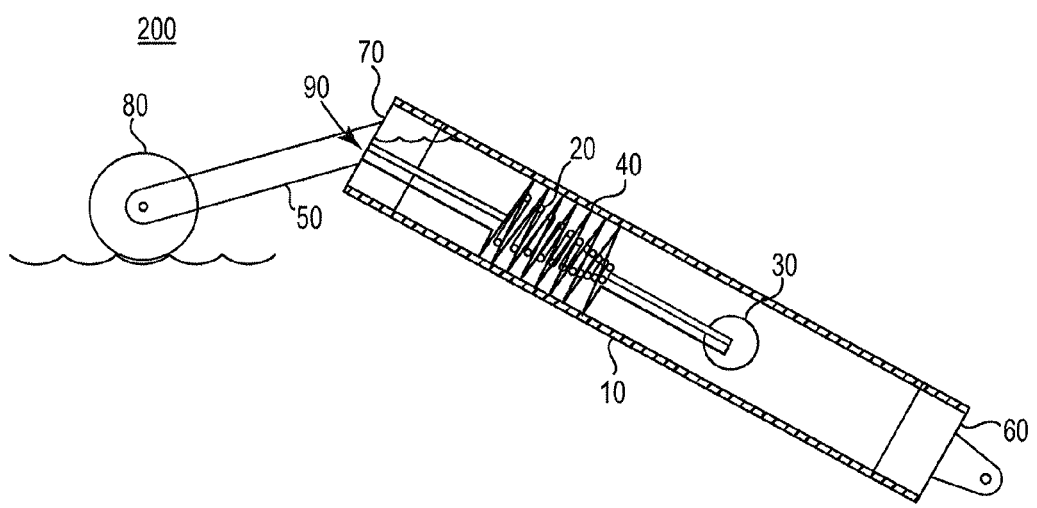
FIG. 5 is a diagram of a cross-section view of a fuel level sensor in a second position according to the another embodiment of the present invention.

With reference to FIG. 5, the fuel level sensor 200 is shown in a position in an instance in which a fuel tank has a moderate fuel level (e.g., the fuel tank is approximately half full). Due to the moderate fuel level, the pivot angle of the sealed housing 10 is moderate (e.g., 45 degrees), resulting in a moderate buoyant force being applied to the internal float 30 and consequently, a moderate force being applied to the coil spring 20. The coil spring 20 may be in a moderately expanded state where a portion of the coils of the coil spring 20 are separated, causing the coil spring 20 to have a moderate resistance.

Figure 6:
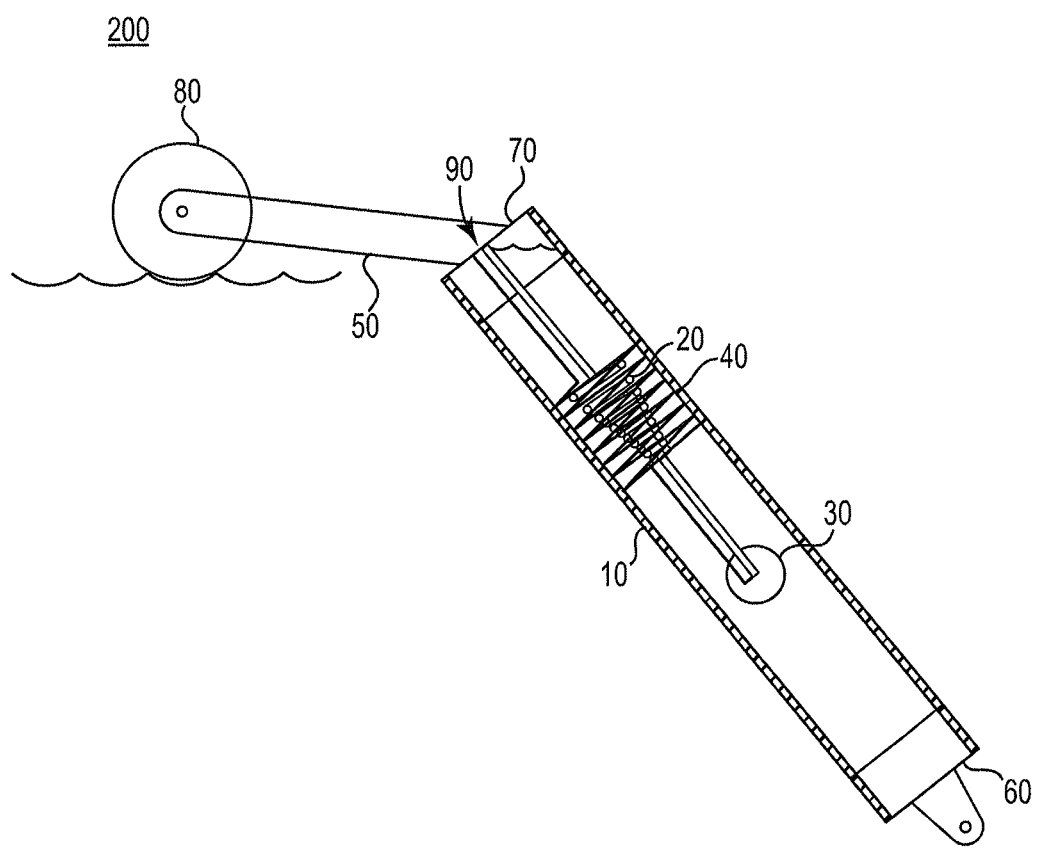
FIG. 6 is a diagram of a cross-section view of a fuel level sensor in a third position according to the another embodiment of the present invention.

With reference to FIG. 6, the fuel level sensor 200 is shown in a position in an instance in which a fuel tank has a high fuel level (e.g., the fuel tank is near full or full). Due to the high fuel level, the pivot angle of the sealed housing 10 is relatively large (e.g., 90 degrees), resulting in a high buoyant force being applied to the internal float 30 and consequently, a high force being applied to the coil spring 20. The coil spring 20 may be in a retracted state where most or all of the coils of the coil spring 20 are electrically coupled to one another, causing the coil spring 20 to have a relatively low resistance.

According to alternative implementations, the coil spring 20 and balance spring 40 may be coupled as described above in connection with FIGS. 4-6, and each may join at one end to the internal float 30 at or near the coupling point, but the other end of each of the coil spring 20 and the balance spring 40 couple to the connection cap 60 instead of joining to the connection cap 70 as with FIGS. 4-6. Thus, one end of each of the springs 20, 40 joins to the connection cap 60 proximate the pivot point of the device. Consequently, because the buoyant movement of the internal float 30 results in movement of the coil spring 20 and balance spring 40, as internal float 30 moves towards the connection cap 70 (e.g., upon a pivoting movement of the fuel level sensor 200 towards vertical), the internal float 30 may apply a corresponding expansion force to the coil spring 20 and the balance spring 40 to expand the coil spring 20 and/or the balance spring 40 resulting in a change in resistance, particularly an increase in resistance due to the windings of the coil spring separating. The connection cap 60 may be configured similarly to the connection cap 70, particularly as described in connection with FIGS. 4-6, and may be conductive and/or may include electric terminals coupled to each of the coil spring 20 and the balance spring 40, respectively, to form a conductive path for joining to a sensor externally arranged relative to the sealed housing 10. This alternative arrangement of the fuel level sensor components within the sealed housing 10 may enable sensing of fuel levels within a fuel tank using a reverse approach compared to the approach described in connection with FIGS. 4-6, and in this alternative arrangement, high fuel levels may correspond to relatively high resistance readings, moderate fuel levels may correspond to relatively moderate resistance readings, and low fuel levels may correspond to relatively low resistance readings.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A sensor, comprising:
   a sealed housing comprising a pivot end, a float end opposite the pivot end and an interior defined by walls extending therebetween, wherein the pivot end is adapted to join to a pivot point and the float end is adapted to join to a float at an exterior of the housing; and
   an electrically conductive coil spring disposed in the housing interior, wherein:
   a first end of the coil spring is joined to the housing at one of the pivot end or the float end;
   a second end of the coil spring opposite the first end is joined to an internal float within the housing;
   the coil spring is adapted to expand and retract in response to movement of the internal float within the housing;
   the coil spring is electrically coupled between the pivot end and the float end of the housing; and
   the coil spring is adapted to electrically couple to a circuit configured to sense a change in resistance in the coil spring in response to expansion and retraction of windings of the coil spring.

2. The sensor of claim 1, wherein the sealed housing further comprises a non-conductive fluid disposed in the interior, and wherein the internal float is arranged in the non-conductive fluid and is adapted to change position in the housing in response to the sensor pivoting about the pivot end.

3. The sensor of claim 2, further comprising an external float joined to the exterior of the housing at the float end, the external float adapted to float within a fluid surrounding at least a portion of the exterior of the housing.

4. The sensor of claim 1, wherein the windings of the coil spring define a conical shape.

5. The sensor of claim 1, further comprising a balance spring joined between the internal float and the housing.

6. The sensor of claim 5, wherein the balance spring is electrically conductive and is electrically connected to the coil spring.

7. The sensor of claim 5, wherein the coil spring is coaxially arranged relative to the balance spring and the balance spring is joined to the housing at the same end as the coil spring.

8. The sensor of claim 1, wherein the sealed housing further comprises end caps defining the pivot end and the float end.

9. The sensor of claim 8, wherein at least one of the end caps comprises conductive material and is adapted to join to the sensor.

10. A fuel sensor, comprising:
a fuel sensor housing adapted to be arranged in a fuel tank, the housing comprising a pivot end, a float end opposite the pivot end and an interior defined by walls extending therebetween, wherein the pivot end is adapted to join to a pivot point in the fuel tank and the float end is adapted to join to an external float arranged in the fuel tank and at an exterior of the housing;
an electrically conductive coil spring disposed in the housing interior, the coil spring joined to an internal float within the housing and electrically coupled between the pivot and float ends of the housing; and
a resistance sensor electrically coupled to the coil spring, wherein a pivot angle of the fuel sensor changes as a fuel level in the fuel tank changes, and in response, the resistance sensor senses a change in resistance in the coil spring as the coil spring expands or retracts.

11. The fuel sensor of claim 10, wherein the coil spring comprises a series of windings having a conical shape.

12. The fuel sensor of claim 10, further comprising a balance spring joined between the internal float and the housing.

13. The fuel sensor of claim 12, wherein the balance spring is electrically conductive and is electrically connected to the coil spring.

14. The fuel sensor of claim 12, wherein the electrically conductive coil spring is coaxially arranged relative to the balance spring.

15. A method of sensing fuel levels in a fuel tank, the method comprising:
sensing a resistance of a conductive path using a resistance sensor, the resistance sensor comprising:
a housing comprising a pivot end, a float end opposite the pivot end and an interior defined by walls extending therebetween, wherein the pivot end is adapted to join to a pivot point in the fuel tank and the float end is adapted to join to an external float arranged in the fuel tank at an exterior of the housing; and
an electrically conductive coil spring disposed in the interior of the housing, the coil spring joined to an internal float within the housing, wherein the internal float is configured to adjust a resistance of the electrically conductive coil spring, the resistance indicative of a fuel level of the fuel tank; and
translating the resistance into the fuel level.

16. The method of claim 15, wherein the electrically conductive coil spring is coaxially arranged relative to a balance spring joined between the internal float and the housing.

* * * * *

UNITED STATES PATENT AND TRADEMARK OFFICE
CERTIFICATE OF CORRECTION

PATENT NO. : 9,488,515 B2 Page 1 of 1
APPLICATION NO. : 14/222975
DATED : November 8, 2016
INVENTOR(S) : Arthur S. Klein It is certified that error appears in the above-identified patent and that said Letters Patent is hereby corrected as shown below:

In the Specification

| Column | Line | PTO | Should Be |
|---|---|---|---|
| 4 | 42 | "the buoyant force; a represents" | -- the buoyant force; α represents -- |

Signed and Sealed this
Tenth Day of January, 2017

Michelle K. Lee
*Director of the United States Patent and Trademark Office*